United States Patent [19]

Nakamichi

[11] Patent Number: 5,028,461
[45] Date of Patent: Jul. 2, 1991

[54] INJECTION MOLDED CONTAINER FOR FOOD

[75] Inventor: Masahiro Nakamichi, Sodegaura, Japan

[73] Assignee: Idemitsu Petrochemical Company Limited, Tokyo, Japan

[21] Appl. No.: 416,230

[22] Filed: Oct. 2, 1989

[30] Foreign Application Priority Data

Oct. 3, 1988 [JP] Japan ................................. 63-250597

[51] Int. Cl.$^5$ .............................................. B65D 85/00
[52] U.S. Cl. ................................. 428/34.5; 426/113; 428/36.4
[58] Field of Search ........................ 428/34.5, 36.4; 426/113

[56] References Cited

U.S. PATENT DOCUMENTS 4,503,168 3/1985 Hartsing, Jr. ........................ 523/100
4,623,565 11/1986 Huybrechts et al. ............... 428/34.5
4,659,598 4/1987 Traut .................................. 428/34.5

FOREIGN PATENT DOCUMENTS 0127852 5/1984 European Pat. Off. .

OTHER PUBLICATIONS

Chemical Abstracts, vol. 97, No. 22, Nov. 29, 1982, p. 46, Abstract No. 183456y.
D. V. Rosato, "Injection Molding Handbook", p. 873, left column, lines 28–38, 1986.

*Primary Examiner*—James J. Seidleck
*Attorney, Agent, or Firm*—Browdy and Neimark

[57] ABSTRACT

The present invention provides an injection molded food container which is produced by injection molding a polyarylene sulfide resin composition containing 20–70% by weight of glass fiber or glass fiber and other inorganic filler and is excellent in heat resistance, oil resistance and mechanical strength and is suitable as a food container used in microwave oven and convection oven having a heater.

The injection molded food container can be manufactured by injection molding a polyarylene sulfide resin composition containing 20–70% by weight of glass fiber or glass fiber and other inorganic filler, using metal mold of which surface roughness is not greater than 5 μm, under condition of mold temperature 130°–180° C.

5 Claims, No Drawings

INJECTION MOLDED CONTAINER FOR FOOD

BACKGROUND OF THE INVENTION

(1) Field of the Invention

The present invention relates to an injection molded food container and method of manufacturing of the same and more particularly to an injection molded food container which is excellent in heat resistance, oil resistance and mechanical strength and is suitable for use as food containers for microwave ovens and convection ovens having a heater, and it also relates to preferable method of manufacturing the same.

(2) Description of the Related Art

Frozen foods and delicatessen type food have become very popular with recent changes of life style.

Heating devices such as microwave ovens, convection ovens having heaters and combined microwave and convection ovens are widely used for thawing or heating of frozen foods or heating of delecatessen type food owing to their convenience.

Furthermore, with changes of eating habits, it has become common to bake bread in heating devices such as convection ovens having heaters or combined microwave and convection ovens.

On the other hand, synthetic resins, for example, polyesters such as polyethylene terephthalate, polycarbonate, polyolefins such as polypropylene, polystyrene and polyvinyl chloride resin have been used for various containers.

When foods are heated by the above-mentioned heating devices, there are used containers made of, for example, polycarbonate, polypropylene, polyester, inorganic filler-containing polypropylene.

However, these conventional containers for heating foods can stand heating in microwave ovens, but have the problem that when they are heated to about 250° C. by convection ovens having heaters which have become popular because of mouth-feel of the heated food or appearance such as formation of broiled marks, they undergo heat distortion and thus cannot be used for this purpose.

Therefore there is a need to distinguish between using plastic containers for microwave ovens and using containers made from the other materials for convection ovens having heaters.

Thus, these conventional plastic containers are inconvenient because they do not have sufficient heat resistance to permit their use in convection ovens having heaters.

Furthermore, even when heating is carried out by microwave oven, if the food to be enclosed or filled therein contains a specific oil, the inside surface of the container is often attacked therewith.

As combined microwave and convection ovens have become popular recently, there is much demand for a plastic container possible to be used for combined microwave and convection ovens.

SUMMARY OF THE INVENTION

The present invention has been accomplished under the above circumstances.

That is, the object of the present invention is to provide an injection molded food container which is excellent in characteristics such as heat resistance, oil resistance and mechanical strength and can be suitably used in any of heating by microwave oven, convection oven having heater and combined microwave and convection oven and besides is high in productivity.

As a result of intensive research conducted by the inventor in order to solve the above problems, it has been found that food containers made by injection molding a specific resin composition are excellent in characteristics such as heat resistance, oil resistance and mechanical strength and can have optional molded shapes and can be suitably used in heating by any of microwave oven, convection oven having heater and combined microwave and convection oven and besides are high in productivity and furthermore, food containers made by injection molding a specific resin composition and further heat treated under specific condition possess the above merits and in addition are non-odorous at using after heating and have excellent characteristics and stability after heating. Adhesion of protective film to food containers made by it is further improved.

That is, the present invention is an injection molded container for food which is made by injection molding a polyarylene sulfide resin composition containing 20–70% by weight of glass fiber or glass fiber and other inorganic filler and another invention is an injection molded container for food which is made by injection molding a polyarylene sulfide resin composition containing 20–70% by weight of glass fiber or glass fiber and other inorganic filler and is subjected to heat treatment at 150°–280° C. for 10 seconds–300 minutes.

Any of the above containers may have a protective film on at least inner surface and are used for convection oven having heater or combined microwave and convection oven.

An injection molded container for food can be manufactured by injection molding a polyarylene sulfide resin composition containing 20–70% by weight of glass fiber or glass fiber and other inorganic filler, using metal mold of which surface roughness is not greater than 5 $\mu$m, under condition of mold temperature 130°–180° C.

DESCRIPTION OF THE PREFERRED EMBODIMENTS

The injection molded food container of the present invention can be obtained by injection molding a polyarylene sulfide resin composition which contains 20–70% by weight of glass fiber or glass fiber and other inorganic filler.

The above polyarylene sulfide resin composition contains at least a polyarylene sulfide resin and glass fiber.

The polyarylene sulfide resin has no special limitation and there may be used, for example, those which are obtained by the known method which comprises carrying out polymerization reaction of halogenated aromatic compound with a sulfur source such as alkali metal sulfide in a polar solvent.

Specific examples are those which have p- or m-phenylene group, alkyl-substituted phenylene group, naphthalene group, p,p'-diphenylenesulfone group, diphenylene ether group or p,p'-biphenylene group as arylene group and those which are mainly composed of them. Furthermore, as suitable ones, mention may be made of block copolymers mainly composed of p-phenylene group such as those which contain at least 70 mol%, preferably at least 85% of recurring unit having p-phenylene group

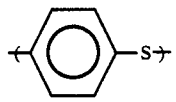

and at most 30 mol%, preferably at most 15 mol% of recurring unit having other group such as m-phenylene group

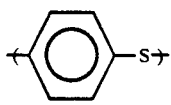

in the form of block in the chain.

Furthermore, the polyarylene sulfide resin may be either straight or branched chain polymer or they may be one partially cured with heat or mixtures thereof.

Melt viscosity of the polyarylene sulfide resin used in the present invention is usually 300-30000 poises, preferably 400-20000 poises (measured at 300° C. and shear rate of 100 sec$^{-1}$).

With regard to the Melt Index (MI) measured by way of ASTM D 1238 (316.5° C., load 5 kg), MI of linear polyarylene sulfide resin used in the present invention is 10-2,000 g/10 min. and MI of heat cured or branched chain polyarylene sulfide resin used in the present invention is 20-1,000 g/10 min.

The glass fiber may be any of alkali-containing glass, low alkali glass and non-alkali glass and shape of this glass fiber has no limitation and is, for example, milled fiber and chopped strand and chopped strand is preferred. The glass fiber may be subjected to surface treatment such as silane treatment, volan treatment or chromium treatment.

Diameter of the glass fiber is generally 5-20 μm, preferably 7-15 μm.

Length of the glass fiber is usually 0.1-20 mm, preferably 1-20 mm. If fiber length is less than 0.1 mm, mechanical strength and heat resistance may be insufficient. If it is more than 20 mm, kneadability and dispersibility are inferior and appearance of the resulting container may become poor.

Aspect ratio of glass fiber whose length and diameter are within the range mentioned above is normally 10-10000, preferably 15-3000.

In the present invention, the polyarylene sulfide resin composition may contain other inorganic fillers in addition to the glass fiber.

Example of the inorganic fillers are silica, calcium carbonate, talc, clay, titanium white, calcium sulfate, calcium sulfite, mica, zeolite, carbon black, carbon fiber, boron fiber, glass powder and whisker such as potassium titanate which are 0.1-30 μm, preferably 0.5-15 μm in particle diameter or fiber diameter.

Content of the glass fiber or the glass fiber and the inorganic filler in the polyarylene sulfide resin composition is usually 20-70% by weight, preferably 30-60% by weight. If content of the glass fiber and so on is less than 20% by weight, heat resistance and strength of injection molded food container made therefrom are inferior and if more than 70% by weight, flowability is decreased to cause deterioration of moldability.

When the polyarylene sulfide resin composition contains glass fiber and inorganic filler, content of the inorganic filler other than the glass fiber is 10-90% by weight, preferably 20-70% by weight of the glass fiber (20-70% weight) and content of glass fiber is desirably at least 20% by weight of the polyarylene sulfide resin composition.

In the concrete, when only glass fiber is contained in the polyarylene sulfide resin composition, content of it is 25-60% by weight, preferably 30-50% by weight. When both of glass fiber and inorganic filler are contained in the polyarylene sulfide resin composition, content of polyarylene sulfide is 25-60% by weight, preferably 25-50% by weight, content of glass fiber is 15-50% by weight, preferably 20-40% by weight and content of an inorganic filler is 10-50% by weight, preferably 15-40% by weight. In case that, the content of glass fiber is not less than 50% by weight, moldability of polyarylene sulfide resin composition tends to be lower. In case that the content of inorganic filler is not less than 40% by weight, the polyarylene sulfide resin composition tends to be brittle and a container made by it tends to be crushed when it is fallen.

The polyarylene sulfide resin composition containing polyarylene sulfide resin and glass fiber or glass fiber and inorganic filler may contain additional components such as coloring agents such as titanium oxide, carbon black, red oxide, cadmium pigments, azo pigments, phthalocyanine pigments, quinacridone pigments, and dioxazine pigments; and various additives such as flowability improver; stabilizer; releasing agent, crystallization accelerator. It may further contain, as far as attainment of the object is not inhibited, resin components, e.g., general-purpose resins such as polyolefin resin, vinyl chloride resin and their copolymer resin, vinylidene chloride resin, vinyl acetate resin, polystyrene and copolymer resin thereof, polyamide resin, polyacetal, polycarbonate, thermoplastic polyester resin, polyphenylene oxide and Noryl resin, polysulfone, fluoro resin and resin modified by unsaturated carboxilic acid.

When the polyarylene sulfide resin composition contains the other components mentioned above, content of these components is generally at most 40% by weight in total.

It is necessary to include the other components in the polyarylene sulfide resin composition so as not to be deterioration of heat resistance of it. For preventing the deterioration of heat resistance, there need to select suitable resin which can not make heat distortion temperature of the polyarylene sulfide resin composition varied from the other components and to determine the content of it. It is important for the injection molded food container of the invention to have high heat resistance. The heat distortion temperature of it (measured by ASTM D648 264 PSI) is not less than 260° C., preferably not less than 265° C. and more preferably not less than 270° C. It is also important for the injection molded food container of the invention to have good high-impact properties. Izod impact strength measured with notch is not less than 3 kg.cm/cm, preferably 5 kg.cm/cm.

The injection molded food container of the first invention is obtained by injection molding the above mentioned polyarylene sulfide resin composition.

Heating temperature (cylinder temperature). injection pressure and mold temperature in injection molding vary depending on the composition of the polyarylene sulfide resin composition and so cannot be simply specified, but usually heating temperature (cylinder temperature) is about 280°-350° C., injection pressure is about 300-1500 kg/cm2 and mold temperature is about 130°–180° C., preferably 135°–170° C. The surface roughness of metal mold is not greater than 5 μm, preferably not greater than 4 μm. In case that the surface roughness of it is greater than 5 μm, glossiness of the container of the invention. In case that the mold temperature is below 130° C., a surface of the container tends to have flow-mark caused by relief of glass fiber so that visual surface of the container becomes bad and value of it as a commodity becomes lower.

Shape of food container made by injection molding has no limitation as long as it has a portion for containing food and it may have any shape of tray, cup, tank, box and other shapes. The surface of the container may have ground pattern such as satin pattern, cut pattern, and rugged pattern.

Such shape and pattern can be optionally obtained by injection molding the polyarylene sulfide resin composition. Although the above-mentioned shape and pattern can be obtained by methods other than injection molding such as compression molding, extrusion molding and stretch blow molding, it is impossible by these molding methods to produce containers of high strength and high heat resistance in optional shapes from the composition containing glass fiber in an amount of at least 20% by weight.

It is preferred in the present invention to further subject the injection molded container to heat treatment at 150°–280° C., preferably 170°–260° C. for 10 seconds–300 minutes, preferably 1–200 minutes.

By this heat treatment, odorless property at heating and adhesion of protective film if this is provided can be further improved without damaging the excellent heat resistance, oil resistance and strength of the injection molded container.

Furthermore, mechanical strength and heat resistance of the polyarylene sulfide resin composition become higher and more stable because wetting property of glass fiber or inorganic filler and crystallizability of polyarylene sulfide are improved by this heat treatment. If the heat treating temperature is lower than 150° C. or heat treating time is shorter than 10 seconds, the above effects cannot be sufficiently exhibited. On the other hand, even if the heat treating temperature is raised to higher than 280° C. or the time is prolonged to more than 300 minutes, improvement of effects cannot be seen and rather heat deformation of the container results.

The heat treatment may be conducted under atmospheric pressure or reduced pressure. Furthermore, it may be conducted in water vapor or hot water. By this heat treatment odorless property at heating and adhesion of protective film if provided of the container can further be improved.

However, heat treating temperature when the treatment is conducted in air under atmospheric pressure or reduced pressure is preferably 200°–280° C. and heat treating temperature when it is conducted in water vapor or hot water is preferably 150°–200° C.

The resulting injection molded food container with or without the heat treatment may have a protective film on at least inner wall surface.

This protective film has function or action to improve sticking resistance, oil resistance, scuff resistance, odorless property and appearance of the injection molded food container of the present invention.

The protective film having such function or action can be formed by coating epoxy coating agent, acrylic coating agent, fluorine-contained resin coating agent and the like or by plating, vapor deposition or sputtering of, for example, nickel and copper.

Among these methods for formation of protective film, preferred is a method of coating a fluorine-contained resin coating agent such as polytetrafluoroethylene, polyvinyl fluoride, or polyvinylidene fluoride. In formation of the protective film, it is preferred to carry out surface treatment of the surface on which the protective film is to be formed such as inner wall surface to enhance adhesion of the protective film thereto.

Such surface treatment includes, for example, sandblasting, solvent treatment, strong acid etching, corona discharge treatment, chromic acid treatment, flame treatment, hot air treatment, and treatments with treating agents such as hydrogen peroxide, acetic acid or mixtures thereof. Preferred is treatment with treating agents such as hydrogen peroxide, acetic acid or mixtures thereof.

Thickness of the protective film is not critical, but ordinarily about 0.1–20 μm suffices.

The injection molded food container of the present invention can be suitably used for heating foods such as frozen foods and delecatessens contained therein by any of microwave oven, convection oven, and combined microwave and convection oven, especially even when it is heated by convection oven.

The present invention will be explained further specifically by the following examples and comparative examples.

EXAMPLE 1

A box-shaped injection molded food container of 150 mm ×100 mm×50 mm with thickness of each portion of 3 mm was prepared by injection molding a polyphenylene sulfide resin composition having the following composition ("PPS.200SG" manufactured by Idemitsu Petrochemical Co., Ltd.) by an injection molding machine [Clamping Pressure: 150 tons, molding pressure: 800 kg/cm$^2$, cylinder temperature: 330° C., mold temperature: 135° C. and surface roughness of mold; 2.0 μm].

Polyphenylene sulfide resin composition

Polyphenylene sulfide resin . . . 35% by weight [Heat cured type, Melt Viscosity; 400 poise (temperature: 300° C., shear rate; 200 sec$^{-1}$), Melt Index; 70 g/10 min (temperature; 316.5° C., lord; 5 kg)]

Glass fiber (length: 3 μmm, average diameter: 13 μm) . . . 30% by weight

Calcium carbonate (average particle diameter: 10 μm) . . . 35% by weight

The thus obtained food container was evaluated on heat resistance and test piece molded under the same condition was evaluated on heat distortion temperature, flexural strength and odor by the following methods. The results are shown in Table 1.

Heat resistance: The container was left to stand at 260° C. for 1 hour and thereafter appearance of this container was evaluated by the following three grades.
3. . . No change occurred.
2. . . Slight discoloration occurred, but this was practically acceptable.
1. . . Much deformation occurred, so that the container was not able to be used.

Heat distortion temperature: According to 264 PSI (conforming to ASTM D648)

Flexural strength: According to ASTM D790

Odor: A frozen uncooked hamburger steak placed in the container was put in the center of a convection type electric oven for home use (output: 1200 W) and cooked at a heating temperature of 260° C. and odor in the oven in this case was evaluated by organoleptic examination.

EXAMPLE 2

A box-shaped injection molded food container of 150 mm ×100 mm×25 mm with thickness of each portion of 2 mm was prepared by injection molding a polyphenylene sulfide resin composition having the following composition ["PPS-100SG" manufactured by Idemitsu Petrochemical Co., Ltd.) under the same conditions as in Example 1.

Polyphenylene sulfide resin composition

Polyphenylene sulfide resin ... 60% by weight
Glass fiber (length: 3 mm, average diameter: 13 μm) ... 40% by weight The thus obtained food container and test piece were evaluated in the same manner as in Example 1 and the results are shown in Table 1.

EXAMPLE 3

The injection molded container of Example 1 was placed in an oven and heat treated at 250° C. for 60 minutes and then the container was cooled by leaving it at room temperature. Then, inner wall surface of the portion of the container where food is to be contained was subjected to Teflon coating to obtain an injection molded food container of the present invention.

This container was evaluated on heat resistance, heat distortion temperature, flexural strength, odor, and adhesion of the protective film. The results are shown in Table 1.

Evaluation of the protective film was conducted in the following manner.

Adhesion of protective film: The container was put in the center of convection type electric oven for home use (output: 1200 W) and was left to stand at 260° C. for 1 hour and degree of peeling of the protective film was visually evaluated.

EXAMPLE 4

Example 3 was repeated except that Teflon coating was not carried out. The results are shown in Table 1.

EXAMPLE 5

Example 3 was repeated except that heat treatment was not carried out. The results are shown in Table 1.

EXAMPLE 6

Example 4 was repeated except that the heat treating temperature was changed from 250° C. to 180° C. The results are shown in Table 1.

Comparative Example 1

An injection molded container was prepared in the same manner as in Example 2 except that a polyethylene sulfide resin composition containing 10% by weight of glass fiber was used. The results of evaluation are shown in Table 1.

Comparative Example 2

An injection molded container was prepared in the same manner as in Example 1 except that a polyethylene terephthalate resin composition having the following composition ("TOUGHEIGHT A300" manufactured by Idemitsu Petrochemical Co., Ltd.) was used in place of the polyphenylene sulfide resin composition ("PPS-200SG" manufactured by Idemitsu Petrochemical Co., Ltd.) and then the inner wall surface of the portion of the container in which food is to be contained was subjected to Teflon coating.

Polyethylene terephthalate resin composition polyethylene terephthalate resin ... 70% by weight
Glass fiber {length: 3 mm, average diameter: 13 μm) ... 30% by weight Example 7

Example 1 was repeated except that talc (average diameter; 3 μm) was used in place of using calcium carbonate.

The results are shown in Table 1.

Example 8

Example 1 was repeated except that linear polyphenylene sulfide having melt viscosity of 1,000 poise and melt index of 0.24 g/10 minute was used in place of polyphenylene sulfide in example 1.

The results are shown in Table 1.

In case that example 1 was repeated except that a metal mold having its roughness of 7 μm was used, glossness of a container was bad.

In case that example 1 was repeated except that molding temperature was 120° C., flow mark happened on a surface of a container caused by relief of glass fiber.

TABLE 1

|  | Heat treating condition | | Heat resis-tance | Heat dis-tortion temp. (°C.) | Flexural strength (kg/cm²) | Izod Impact Strength (with Notch) | Odor | Adhesion of protective film |
|---|---|---|---|---|---|---|---|---|
|  | Temp. (°C.) | Time (min) |  |  |  |  |  |  |
| Exp. 1 | — | — | 3 | 275 | 2000 | 6.5 | Somewhat | — |
| Exp. 2 | — | — | 3 | 270 | 2400 | 8.2 | Somewhat | — |
| Exp. 3 | 250 | 60 | 3 | 275 | 2000 | 6.5 | No | No peeling |
| Exp. 4 | 250 | 60 | 3 | 275 | 2000 | 6.5 | No | — |
| Exp. 5 | — | — | 3 | 275 | 2000 | 6.5 | Slight | Partial peeling |
| Exp. 6 | 180 | 60 | 3 | 275 | 2000 | 6.5 | Slight | — |
| Comp. Exp. 1 | — | — | 2 | 240 | 1200 | 3.5 | Considerable | — |
| Comp. Exp. 2 | — | — | 1 | 240 | 2100 | 5.8 | No | Partial peeling |
| Exp. 7 | — | — | 3 | 268 | 1900 | 6.0 | Somewhat | — |
| Exp. 8 | — | — | 3 | 265 | 2200 | 7.2 | Somewhat | — |

According to the present invention, an injection molded food container having various advantages as mentioned below can be provided (1) Since the container is made by injection molding a polyarylene sulfide resin composition containing a polyarylene sulfide resin excellent in properties such as heat resistance, oil resistance and mechanical strength and besides a specific amount of glass fiber or glass fiber and other inorganic filler, the container can be suitably used not only for heating of foods such as frozen foods or delicatessens by a microwave oven, but also for heating of them by a convection oven or a combined microwave and convection oven which are higher in heating temperature. Accordingly cook has no need to consider which oven should be used for heating food in a container of the invection.

(2) The container can be easily produced by injection molding and hence productivity thereof is high.

(3) The container is further improved in odorless property and adhesion of protective film thereto if this is provided, by subjecting it to a specific heat treatment.

(4) The container is further improved in scuff resistance and strength by providing the protective film.

What is claimed is:

1. An injection molded food container having a body injection molded of a material selected from the group consisting of:

(1) a mixture consisting essentially of 30–50% by weight of glass fiber and 70–50% by weight of polyarylene sulfide resin, and (2) a mixture consisting essentially of 15–50% by weight of glass fiber, 15–40% by weight of an inorganic filler other than glass fiber, and 25–60% by weight of polyarylene sulfide resin, said polyarylene sulfide resin having an initial melt viscosity of 300–30,000 poises and an initial melt index of 10–2,000 g/10min, and a heat cured melt index of 20–1,000 g/10min, said glass fiber has a diameter of 5–20 μm, a length of 0.1–20 mm and an aspect ratio of 10–10,000, and said body having a heat distortion temperature of at least 260° C. and an Izod notched impact strength of at least 3 kg. cm/cm.

2. An injection molded food container according to claim 1, which has been heat treated at 150°–280° C. for 10 seconds–300 minutes.

3. An injection molded food container according to claim 1, wherein the glass fiber has a length of 1–20 mm and an aspect ratio of 15–3,000.

4. An injection molded food container according to claim 1, wherein the inorganic filler is calcium carbonate, talc, titanium white, or calcium sulfate.

5. An injection molded food container according to claim 1 which has a protective film on at least an inner wall surface thereof.

* * * * *